United States Patent
Manzoni et al.

(10) Patent No.: US 6,342,569 B1
(45) Date of Patent: Jan. 29, 2002

(54) CHLOROTRIFLUOROETHYLENE COPOLYMERS

(75) Inventors: Claudia Manzoni, Bologna; Julio A. Abusleme, Varese; Massimo Malavasi, Milan, all of (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 09/323,844

(22) Filed: Jun. 2, 1999

(30) Foreign Application Priority Data

Jun. 4, 1998 (IT) .......................... MI98A1251

(51) Int. Cl.$^7$ .............................................. C08F 114/18
(52) U.S. Cl. .................... 526/249; 526/255; 526/317.1; 526/320; 526/328.5; 526/329.4
(58) Field of Search ................................ 526/249, 255, 526/317.1, 320, 328.5, 329.4

(56) References Cited

U.S. PATENT DOCUMENTS

| | | |
|---|---|---|
| 4,513,129 A | 4/1985 | Nakagawa et al. |
| 4,789,717 A | 12/1988 | Giannetti et al. |
| 4,864,006 A | 9/1989 | Giannetti et al. |
| 4,954,589 A * | 9/1990 | Sugawara et al. .......... 526/255 |
| 5,021,516 A | 6/1991 | Wheland |
| 5,182,342 A | 1/1993 | Fiering et al. |
| 5,453,477 A | 9/1995 | Oxenrider et al. |
| 5,498,680 A | 3/1996 | Abusleme et al. |
| 5,569,728 A | 10/1996 | Abusleme et al. |
| 5,880,204 A * | 3/1999 | McCarthy et al. .......... 524/520 |
| 6,107,393 A * | 8/2000 | Abusleme et al. .......... 524/545 |

FOREIGN PATENT DOCUMENTS

| | | |
|---|---|---|
| BE | 640479 A | 3/1964 |
| EP | 0 185 242 A2 | 6/1986 |
| EP | 0 186 215 A2 | 7/1986 |
| WO | 97 11979 A | 4/1997 |

* cited by examiner

Primary Examiner—Helen L. Pezzuto
(74) Attorney, Agent, or Firm—Arent Fox Kintner Plotkin Kahn, PLLC.

(57) ABSTRACT

Thermoprocessable copolymer, having a Melt Flow Index (MFI) between 0.01 and 1000, of the CTFE with an acrylic monomer having the general formula:

$$CH_2=CH-CO-O-R_1 \qquad (I)$$

wherein $R_1$ is a hydrogenated radical from 1 to 20 C atoms, $C_1-C_{20}$, alkyl, linear and/or branched, or cycloalkyl radical, or $R_1$ is H. The radical $R_1$ can optionally contain: heteroatoms preferably Cl, O, N; one or more functional groups preferably selected from —OH, —COOH, epoxide, ester and ether; and double bonds; the amount of the comonomer of formula (I) ranges from 0.01 to 5% by moles.

11 Claims, No Drawings

CHLOROTRIFLUOROETHYLENE COPOLYMERS

The present invention relates to thermoprocessable fluorinated polymers having good mechanical and gas and vapour barrier properties.

Specifically the present invention relates to chlorotrifluoroethylene (CTFE) thermoprocessable copolymers with acrylic monomers having improved mechanical and gas and vapour barrier properties in comparison with the CTFE homopolymer (PCTFE).

More specifically the present invention relates to CTFE copolymers with acrylic monomers to be used for packaging applications requiring good impermeability to gases and vapours, more specifically to oxygen, nitrogen and water vapor.

The good CTFE homopolymer impermeability both to gases and to water vapor is known. The high molecular weight polymers show also good mechanical properties but because of the high melt viscosity their processability is difficult and they can give articles having surface defects. On the contrary the polymers having a lower molecular weight are easily processable because of the low melt viscosity but they show poor mechanical properties. In particular the required processability conditions are for the obtainment of films, used also in multilayer systems, for packaging of food and pharmaceutical products.

The need was felt to have available fluorinated polymers having: good gas and vapour barrier properties, specifically water vapor; good mechanical properties; suitable melt viscosity for the film processing.

The Applicant has surprisingly and unexpectedly found CTFE thermoprocessable copolymers with acrylic monomers having good mechanical properties, good gas and vapour -specifically water vapor-barrier properties, and suitable melt viscosities for the film processing.

It is therefore an object of the present invention a thermoprocessable copolymer, having a Melt Flow Index (MFI) between 0.01 and 1000, of the CTFE with an acrylic monomer having the general formula:

$$CH_2=CH-CO-O-R_1 \quad (I)$$

wherein $R_1$ is hydrogenated radical from 1 to 20 C atoms $C_1$–$C_{20}$, preferably alkyl, linear and/or branched, or cycloalkyl radical, having from 4 to 20 atoms, or $R_1$ is H. The radical $R_1$ can optionally contain: heteroatoms preferably Cl, O, N; one or more functional groups preferably selected from —OH, —COOH, epoxide, ester and ether; and double bonds.

The amount of the comonomer of formula (I) ranges from 0.01 to 5% by moles, preferably from 0.05 to 2% by moles, more preferably from 0.1 to 1% by moles.

$R_1$ is preferably an alkyl radical from 1 to 10 C atoms containing one or more hydroxy functional groups.

As comonomer of formula (I), ethylacrylate, n-butylacrylate, acrylic acid, hydroxyethylacrylate, hydroxypropylacrylate, (hydroxy) ethylhexylacrylate, etc., can be mentioned.

A further object of the present invention is the use of the CTFE copolymers with acrylic monomers having a Melt Flow Index (MFI) between 0.1 and 50, preferably between 0.5 and 20, more preferably between 2 and 10, for the production of films.

The preparation process of the copolymer of the present invention is carried out according to known techniques, by copolymerization of the corresponding monomers, in suspension in organic medium or in aqueous emulsion, in the presence of a suitable radical initiator, at a temperature in the range from –20 to 100° C., preferably from –5 to 60° C., more preferably from 5 to 30° C. The reaction pressure is in the range 1–40 bar, preferably 2–20 bar.

Among the various radical initiators, in particular, can be used:

(i) bis-acylperoxides of formula $(R_f-CO-O)_2$, wherein $R_f$ is a $C_1$–$C_{10}$ (per)haloalkyl (see for instance EP 185,242 and U.S. Pat. No. 4,513,129), or a perfluoropolyoxyalkylene group (see for instance EP 186,215 and U.S. Pat. No. 5,021,516); among them, bis-trichloroacetylperoxide and bis-dichlorofluoroacetylperoxide, are particularly preferred (see U.S. Pat. No. 5,569,728);

(ii) water soluble inorganic peroxides, such as ammonium or alkaline metals persulphates or perphosphates; sodium and potassium persulphate are particularly preferred;

(iii) organic or inorganic redox systems, such as ammonium persulphate/sodium sulphite, hydrogen peroxide/aminoimi-nomethansulphinic acid, and terbutylhydroperoxide/metabisulphite (see U.S. Pat. No. 5,453,477).

In the suspension copolymerization, the reaction medium is formed by an organic phase, to which water is sometimes added in order to favour the heat dispersion during the reaction. The organic phase can be formed by the monomers themselves, without addition of solvents, or by the monomers dissolved in a suitable organic solvent. As organic solvents, chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc., are conventionally used. Since such products have a destroying effect on the ozone present in the stratosphere, alternative products have been recently proposed, such as the compounds containing only carbon, fluorine, hydrogen, and optionally oxygen, described in U.S. Pat. No. 5,182,342. In particular (per)fluoropolyethers with at least one hydrogenated end group, preferably two, such as —$CF_2H$, —$CF_2CF_2H$, —$CF(CF_3)H$, can be used.

The amount of water in the reaction medium must be lower than 5% by weight when preparing the copolymers of the present invention in suspension in organic medium wherein $R_1$ contains one or more —OH and/or —COOH groups.

In the aqueous emulsion (co)polymerization, the presence of a suitable surfactant is required. The fluorinated surfactants of formula:

$$R_f-X^-M^+$$

are the most commonly used, wherein $R_f$ is a $C_5$–$C_{16}$ (per) fluoroalkyl chain or a (per) fluoropolyoxyalkylene chain, $X^-$ is —$COO^-$ or —$SO_3^-$, $M^+$ is selected from: $H^+$, $NH_4^+$, an alkaline metal ion. Among them we can mention: ammonium and/or sodium perfluoro-octanoate, (per) fluoropolyoxyalkylenes having one or more one or more carboxylic end groups, etc.

The process object of the present invention can be advantageously carried out in the presence of dispersions, emulsions or microemulsions of perfluoropolyoxyalkylenes, according to U.S. Pat. No. 4,789,717 and U.S. Pat. No. 4,864,006, or also microemulsions of fluoropolyoxyalkylenes having hydrogenated end groups and/or hydrogenated repeating units, according to U.S. Pat. No. 4,498,680.

The addition of the comonomer of formula (I), as such or in solution with the above solvents in polymerization occurs according to known techniques in the art. However a continuous or step addition are particularly preferred in the synthesis of copolymers of the present invention having a composition higher than 0.1% by moles of the comonomer of formula (I).

The molecular weight control of the fluorinated polymers of this invention can be carried out by: a suitable dosage of the radical initiator in polymerization; the use of telogen agents (chain transfer agents); the use of the monomers of formula (I) which can show a telogen activity comparable with the known chain transfer agent. The molecular weight adjustment is preferred in absence of specific telogen agents.

When chain transfer agents are used, these can be hydrocarbons or halogenated hydrocarbons, for instance chloroform, HCFC 123, ethane, methane, etc. The chain transfer agent is introduced into the reactor at the beginning of the reaction, or continuously or step by step during the polymerization. The amount of chain transfer agent can range within rather wide limits, depending on the polymerization conditions (reaction temperature, monomers, molecular weight required of the polymer, etc). Generally, such amount ranges between 0.001 and 5% by weight, preferably between 0.05 and 1% by weight, with respect to the total amount of monomers introduced in the reactor.

A remarkable advantage of the comonomers (c) of the present invention is given by the fact that their high reactivity in the polymerization system of the invention does not require, after reaction, the recovery of the unreacted monomers.

The viscosity measurement of the polymers object of the present invention is made by the Melt Flow Index (MFI) measurement at 265° C. and a 5 Kg load according to ASTM D 1238–88.

The second melting temperature $(T_{2f})$, is determined by differential scanning calorimetry (DSC).

The formula (I) comonomer content is determined by mass balance assuming a quantitative conversion of the comonomer itself. This high reactivity has been confirmed by $^1$H-NMR analysis of the copolymers exemplified.

The mechanical properties at 23° C. have been obtained by the ASTM D1708 method by using compression-molded samples.

The permeability to oxygen has been determined according to the ASTM D1434 method at room temperature (23.5±0.2° C.) by using compression-molded sheets having a 0.3 mm nominal thickness.

The permeability to water vapor (Water Vapor Transmition Rate: WVTR) has been determined by the Mocon PERMATRAN W200 equipment according to the ASTM F1249 method by using compression-molded sheets having a 0.3 mm nominal thickness. The method sensitivity is 0.05 $g/m^2*24$ h. The operating conditions are 38° C. and RH (relative humidity) is 90%.

Some examples of the present invention are reported hereinafter, whose purpose is merely illustrative and not limitative of the scope of the invention itself.

EXAMPLE 1

In a 18 l enamelled autoclave equipped with baffles and stirrer working at 450 rpm, 0.5 l of demineralized water, 0.66 ml of a hydroxypropylacrylate solution in CFC-113 in 1:1 by volume ratio and 15 kg of chlorotrifluoroethylene (CTFE) were introduced. The autoclave was then heated up to the reaction temperature of 20° C. corresponding to an initial pressure of 6 absolute bar. In the autoclave the radical initiator in the form of a trichloroacetylperoxide (TCAP) solution in CFC-113, maintained at −17° C., having a titre equal to 0.12 g TCAP/ml, was then continuously fed with a 12 ml/h flow-rate during the polymerization (13 hours). Further 0.66 ml of the hydroxypropylacrylate solution in CFC-113 were moreover introduced every 30 minutes during the polymerization for a total amount of 17 ml including the initial amount.

The product discharged from the autoclave was dried at 120° C. for about 16 hours. The amount of dry product obtained was 880 g.

Some characteristics of the obtained product are reported in Table 1. The mechanical properties at 23° C. are reported in Table 2.

EXAMPLE 2

Example 1 was repeated maintaining the same temperature and pressure conditions and using the same amounts of the hydroxypropylacrylate solution in CFC-113, and of CTFE. However the polymerization was carried out in absence of water. In the autoclave the radical initiator in the form of a trichloroacetylperoxide (TCAP) solution in CFC 113, having a titre equal to 0.15 g TCAP/ml, maintained at −17° C., was continuously fed with a 15 ml/h flow-rate during the polymerization (13 hours).

Further 0.66 ml of the hydroxypropylacrylate solution in CFC-113 were moreover introduced every 30 minutes during the polymerization for a total amount of 17 ml including the initial amount.

The product discharged from the autoclave was dried at 120° C. for about 16 hours. The amount of dry product obtained was 1680 g.

The permeability measurement to water vapor was lower than the minimum detectable value of 0.05 $g/m^2*24$ h of the instrument.

Some characteristics of the obtained product are reported in Table 1. The mechanical properties at 23° C. are reported in Table 2.

EXAMPLE 3

Example 2 was repeated except that in the autoclave the radical initiator in the form of a trichloroacetylperoxide (TCAP) solution in CFC 113, maintained at −17° C., having a titre equal to 0.12 g TCAP/ml, was continuously fed with a 12 ml/h flow-rate during the polymerization (9 hours).

Further 0.66 ml of the hydroxypropylacrylate solution in CFC-113 were moreover introduced every 30 minutes during the polymerization for a total amount of 12 ml including the initial amount.

The product discharged from the autoclave was dried at 120° C. for about 16 hours. The amount of dry product obtained was 1325 g.

Some characteristics of the obtained product are reported in Table 1. The mechanical properties at 23° C. are reported in Table 2.

EXAMPLE 4

In a 18 l enamelled autoclave equipped with baffles and stirrer working at 450 rpm, 0.33 ml of n-butylacrylate and 15 kg of chlorotrifluoroethylene (CTFE) were introduced. The autoclave was then heated up to the reaction temperature of 20° C. corresponding to an initial pressure of 6 absolute bar. In the autoclave the radical initiator in the form of a trichloroacetylperoxide (TCAP) solution in CFC-113, maintained at −17° C., having a titre equal to 0.12 g TCAP/ml, was then continuously fed with a 18 ml/h flow-rate during the polymerization (9 hours). Further 0.33 ml of n-butylacrylate were moreover introduced every 30 minutes during the polymerization for a total amount of 6 ml including the initial amount.

The product discharged from the autoclave was dried at 120° C. for about 16 hours. The amount of dry product obtained was 1170 g.

Some characteristics of the obtained product are reported in Table 1. The mechanical properties at 23° C. are reported in Table 2.

EXAMPLE 5

Example 4 was repeated except that 8 l of demineralized water and 4 kg of CTFE were initially charged to the autoclave. The autoclave was then heated up to the reaction temperature of 20° C. corresponding to an initial pressure of 6 absolute bar. In the autoclave the radical initiator in the form of a trichloroacetylperoxide (TCAP) solution in CFC-113, maintained at −17° C., having a titre equal to 0.12 g TCAP/ml, was then continuously fed with a 18 ml/h flow-rate during the polymerization (9 hours). Further 0.33 ml of n-butylacrylate were moreover introduced every 60 minutes during the polymerization for a total amount of 3 ml including the initial amount.

The product discharged from the autoclave was dried at 120° C. for about 16 hours. The amount of dry product obtained was 652 g.

Some characteristics of the obtained product are reported in Table 1. The mechanical properties at 23° C. are reported in Table 2.

EXAMPLE 6

Example 5 was repeated except that in the autoclave the radical initiator in the form of a trichloroacetylperoxide solution (TCAP) in CFC-113, maintained at −17° C., having a titre equal to 0.12 g TCAP/ml, was continuously fed with a 30 ml/h flow-rate during the polymerization (9 hours).

Further 0.33 ml of n-butylacrylate were moreover introduced every 20 minutes during the polymerization for a total amount of 9 ml including the initial amount.

The product discharged from the autoclave was dried at 120° C. for about 16 hours. The amount of dry product obtained was 625 g.

Some characteristics of the obtained product are reported in Table 1.

EXAMPLE 7 (comparative)

In a 18 l enamelled autoclave equipped with baffles and stirrer working at 450 rpm, 5 l of demineralized water and 8 kg of chlorotrifluoroethylene (CTFE) were introduced. The autoclave was then heated up to the reaction temperature of 20° C. corresponding to an initial pressure of 6 absolute bar. In the autoclave the radical initiator in the form of a trichloroacetylperoxide (TCAP) solution in CFC-113, maintained at −17° C., having a titre equal to 0.11 g TCAP/ml, was then continuously fed with a 32 ml/h flow-rate during the polymerization (9 hours).

The product discharged from the autoclave was dried at 120° C. for about 16 hours. The amount of dry product obtained was 1301 g.

Some characteristics of the obtained product are reported in Table 1. The mechanical properties at 23° C. are reported in Table 2.

From the observation of Tables 1 and 2 and of the Examples, it is clear that the Applicant has found thermoprocessable copolymers of CTFE with acrylic monomers having good barrier properties to gases (e.g. $O_2$) and water vapor and improved mechanical properties in comparison with the homopolymer.

TABLE 1

Monomer composition, $T_{2f}$ and oxygen-permeability

| EXAMPLES | Comonomer | % (by moles) | Second melting temperature $T_{2f}$ (° C.) | Permeability $O_2$ (cc*mm/m²* 24h*atm) |
|---|---|---|---|---|
| 1 | hydroxypropyl acrylate | 0.91 | 203.1 | 3.15 |
| 2 | hydroxypropyl acrylate | 0.48 | 205.3 | 3.49 |
| 3 | hydroxypropyl acrylate | 0.43 | 209.1 | 3.95 |
| 4 | butyl acrylate | 0.42 | 207.8 | 4.21 |
| 5 | butyl acrylate | 0.37 | 209.4 | 4.02 |
| 6 | butyl acrylate | 1.2 | 197.0 | 7.70 |
| 7 (comp) | — | — | 213.3 | 4.22 |

TABLE 2

Mechanical properties at 23° C.

| Examples | 1 | 2 | 3 | 4 | 5 | 7 (comp) |
|---|---|---|---|---|---|---|
| Melt Flow Index (MFI, g/10') | 3.8 | 4.2 | 2.4 | 1.9 | 4.2 | 2.3 |
| Elastic Modulus (MPa) | 1242 | 1185 | 1292 | 1247 | 1391 | 1331 |
| Yield stress (MPa) | 41.8 | 43.1 | 44.7 | 44.8 | 46.8 | 45.1 |
| Stress at break (MPa) | 28.9 | 29.9 | 29.4 | 29.5 | 30.0 | 24.8 |
| Elongation at break (%) | 128 | 106 | 88 | 79 | 63 | 40 |

EXAMPLE 8

Example 2 was repeated ten times and the material was extruded into pellets in a single screw extruder. The pellets were then processed in an extruder to produce a film of about 100μ thickness.

The mechanical properties are reported in Table 3. The water-vapor permeability on a film of 89μ of thickness was less than 0.05 g/m²*24 h.

TABLE 3

Mechanical properties of the film of Example 8.
MD. Machine Direction. TD. Traverse Direction

| | MD | TD |
|---|---|---|
| Elastic Modulus (MPa) | 1460 | 1292 |
| Yield stress (MPa) | 41.2 | 39.1 |
| Yield strain (%) | 7 | 6.5 |
| Stress at break (MPa) | 47 | 27.3 |

TABLE 3-continued

Mechanical properties of the film of Example 8.
MD. Machine Direction. TD. Traverse Direction

|  | MD | TD |
|---|---|---|
| Strain at break (%) | 91 | 115 |

What is claimed is:

1. A thermoprocessable copolymer, having a Melt Flow Index (MFI) between 0.01 and 1,000, consisting of chlorotrifluoroethylene (CTFE) and an acrylic monomer having the formula:

$$CH_2=CH-CO-O-R_1 \qquad (I)$$

wherein $R_1$ is a hydrogenated radical from 1 to 20 C atoms or $R_1$ is $H_1$ wherein $R_1$ can optionally contain: heteroatoms; one or more functional groups; and double bonds; and wherein the amount of the comonomer of formula (I) ranges from 0.01 to 5% by moles.

2. A copolymer according to claim 1 wherein $R_1$ is an alkyl radical from 1 to 10 C atoms containing one or more hydroxy functional groups.

3. A copolymer according to claim 1, wherein the acrylic monomer of general formula (I) is selected from: ethylacrylate, n-butylacrylate, acrylic acid, hydroxyethylacrylate, hydroxypropylacrylate, (hydroxy)-ethylhexylacrylate.

4. A copolymer according to claim 1 wherein the comonomer amount ranges from 0.05 to 2% by moles.

5. A copolymer according to claim 4 wherein the comonomer amount ranges from 0.1 to 1% by moles.

6. A film prepared from copolymers according to claim 1, said copolymers having a Melt Flow Index (MFI) between 0.01 and 50.

7. A film prepared from copolymers according to claim 6, said copolymers having a Melt Flow Index (MFI) between 0.5 and 20.

8. A film prepared from the copolymers according to claim 7, said copolymers having a Melt Flow Index (MFI) between 2 and 10.

9. A copolymer according to claim 1 wherein $R_1$ is an alkyl radical, linear and/or branched, having from 1 to 20 C atoms, or cycloalkyl radical having from 4 to 20 C atoms.

10. A copolymer according to claim 1 wherein the heteroatoms are selected from the group consisting of Cl, O and N.

11. A copolymer according to claim 1 wherein the one or more functional groups are selected from the group consisting of —OH, —COOH, epoxide, ester and ether.

* * * * *